(12) United States Patent
Tylik et al.

(10) Patent No.: US 9,613,192 B2
(45) Date of Patent: Apr. 4, 2017

(54) FLEXIBLE LICENSING ARCHITECTURE

(71) Applicant: EMC Corporation, Hopkinton, MA (US)

(72) Inventors: Dmitry Nikolayevich Tylik, Saint Petersburg (RU); Yuri Alexandrovich Stotski, Saint Petersburg (RU); Alexander Georgievich Akopyan, Saint Petersburg (RU); Alexander Vladimirovich Sorotsky, Saint Petersburg (RU); Stanislav Yevgenyevich Gorshkov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/369,091

(22) PCT Filed: Sep. 27, 2013

(86) PCT No.: PCT/RU2013/000847
§ 371 (c)(1),
(2) Date: Jun. 26, 2014

(87) PCT Pub. No.: WO2015/047127
PCT Pub. Date: Apr. 2, 2015

(65) Prior Publication Data
US 2015/0227723 A1    Aug. 13, 2015

(51) Int. Cl.
*G06F 21/12*    (2013.01)
*G06F 9/44*    (2006.01)
(Continued)

(52) U.S. Cl.
CPC ............ *G06F 21/12* (2013.01); *G06F 9/4401* (2013.01); *G06F 12/02* (2013.01);
(Continued)

(58) Field of Classification Search
CPC .. G06F 21/12; G06F 17/30312; G06F 21/121; G06F 12/02; G06F 21/629; G06F 9/4401; G06F 2221/0704
(Continued)

(56) References Cited

U.S. PATENT DOCUMENTS 6,907,597 B1    6/2005    Mamona et al.
7,092,907 B2 *    8/2006    Kanevsky ............... G06F 21/10
                                                                                                             705/51
(Continued)

FOREIGN PATENT DOCUMENTS

EP            1793323 A2    6/2007

OTHER PUBLICATIONS

Microsoft Corporation, "Differences with Windows XP Home Edition" Nov. 3, 2005, pp. 1-4, https://technet.microsoft.com/en-us/library/bb457127.aspx.*

*Primary Examiner* — Robert Leung
*Assistant Examiner* — Thomas Ho
(74) *Attorney, Agent, or Firm* — BainwoodHuang

(57) ABSTRACT

An improved technique involves analyzing a system configuration upon a system boot and sending the configuration to a system configuration database that provides configuration details for enabling features of a software package. Such configuration details take the form of configuration parameters having values that may include, for example, an amount of RAM installed in the system, or the operating system used. The configuration database stores values of these parameters in a persistent store and makes these values available to the system when a software package is launched. At this point, the system accesses the database and obtains the values of the configuration parameters. The system uses these values to determine whether to activate particular features of the software package.

21 Claims, 5 Drawing Sheets

(51) Int. Cl.
*G06F 12/02* (2006.01)
*G06F 17/30* (2006.01)
*G06F 21/62* (2013.01)

(52) U.S. Cl.
CPC ...... *G06F 17/30312* (2013.01); *G06F 21/121* (2013.01); *G06F 21/629* (2013.01); *G06F 2221/0704* (2013.01)

(58) Field of Classification Search
USPC .......................................................... 726/26
See application file for complete search history.

(56) References Cited

U.S. PATENT DOCUMENTS

| | | | |
|---|---|---|---|
| 7,680,743 B2 | 3/2010 | Peinado et al. | |
| 8,224,750 B1* | 7/2012 | Bennett ................... | G06F 21/10 705/51 |
| 8,484,249 B1* | 7/2013 | Soundararajan ........ | G06F 17/30 707/791 |
| 2002/0026505 A1* | 2/2002 | Terry ....................... | G06F 21/52 709/221 |
| 2002/0095310 A1* | 7/2002 | Kobayashi ............ | G06F 9/4411 713/1 |
| 2011/0131646 A1* | 6/2011 | Park ................... | H04L 63/1458 726/13 |
| 2013/0166724 A1* | 6/2013 | Bairavasundaram . | G06F 9/5016 709/224 |
| 2013/0198856 A1 | 8/2013 | Li et al. | |
| 2013/0198864 A1 | 8/2013 | Li et al. | |
| 2014/0007239 A1* | 1/2014 | Sharpe .................. | G06F 21/561 726/24 |

\* cited by examiner

FLEXIBLE LICENSING ARCHITECTURE

BACKGROUND

Commercial software packages typically use licenses to control access to services those packages provide. For example, a user who acquires a software package may not be able to use that package until the user provides a code generated when the user submits payment. Once the user provides the code in, e.g., a dialog window, the license manager verifies that the code matches that in a secure database and allows the execution of the software to proceed.

Sophisticated software packages having multiple features may have separate licenses for each of those features. In this case, a conventional licensing architecture provides licensing capability that enables certain features in a software product while not enabling other features. For example, a software product may have basic features that are available upon payment of a basic fee and advanced features that are available upon payment of an additional fee. When a user has paid only the basic fee, the licensing capability ensures that the license for the basic features is turned on while the license for the advanced features is turned off. Upon payment of the additional fee, the user provides a code that turns on the license for the advanced features.

In some arrangements, licenses may take the form of feature enablers. Feature enablers are small programs that interact with data structures such as the system registry of Microsoft® Windows in order to tune system according to required configuration. In other arrangements, however, licenses take the form of electronic licenses that include text files containing encrypted codes.

SUMMARY

Unfortunately, there are deficiencies with the above-described conventional licensing architectures. For example, consider software for controlling storage systems that requires licenses for features that implement various file- and block-level services. Such software may require different software images for different deployments such as block-only or unified system architectures. Such different software images can be inconvenient, especially when a user chooses to upgrade a storage system platform. The user may need to install new software to control licenses, even though the software package has not changed. In some cases, simply changing hardware setup (e.g., increasing RAM or installing optional modules) would require a new software image.

Further, a software provider would also need to create new software images for each new storage platform. Such new software images would add to the cost of developing software that does not add anything useful from the user's perspective.

Moreover, licenses that take the form of feature enablers typically do not node lock the software, meaning that such licenses may be used with multiple machines against the wishes of the distributor of the software. Licenses that take the form of electronic licenses, on the other hand, allow for processes that are not licensed to consume system resources.

In contrast with the above-described conventional license architecture which requires different software images for different platforms, an improved technique involves analyzing a system configuration upon a system boot and sending the configuration to a system configuration database that provides configuration details for enabling features of a software package. Such configuration details take the form of configuration parameters having values that may include, for example, an amount of RAM installed in the system, or the operating system used. The configuration database stores values of these parameters in a persistent store and makes these values available to the system when a software package is launched. At this point, the system accesses the database and obtains the values of the configuration parameters. The system uses these values to determine whether to activate particular features of the software package.

Advantageously, the improved technique provides for a single software image that adapts to different system and licensing configurations, and provides secure, node-locked licensing that minimizes the consumption of unnecessary system resources. Because the system undergoes a discovery of its configuration upon a boot, it can determine changes in configuration from the previous boot. For example, the system may determine if the user upgraded a storage platform from block-only to unified block and file between boots. In this case, the system may determine the features available to the user given the state of the licenses in concert with the change in platform setup.

One embodiment of the improved technique is directed to a method of operating a computing device configured to run a particular software product, the software product including a set of features. The method includes performing an analysis of a system configuration of the computing device, the analysis producing values of a set of system configuration parameters upon a boot of the computing device. The method also includes storing the values of the set of system configuration parameters in a system configuration database. The method further includes extracting the values of the system configuration parameters from the system configuration database upon receiving a command to run the particular software product. The method further includes performing, for each feature of the set of features, an activation decision operation on that feature based on values of the system configuration parameters, the activation decision operation resulting in a decision to activate or not activate that feature and associated software modules Additionally, some embodiments of the improved technique are directed to an apparatus constructed and arranged to operate a computing device configured to run a particular software product. The apparatus includes memory and one or more processors coupled to the memory to form controlling circuitry. The controlling circuitry is constructed and arranged to carry out the method of operating a computing device configured to run a particular software product.

Furthermore, some embodiments of the improved technique are directed to a computer program product having a non-transitory computer readable storage medium which stores code including a set of instructions which, when executed by a computer, cause the computer to carry out a method of operating a computing device configured to run a particular software product.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of providing for a licensing architecture involves analyzing a system configuration upon a system boot and sending the configuration to a system configuration database that provides configuration details for enabling features of a software package. Such configuration details take the form of configuration parameters having values that may include, for example, an amount of RAM installed in the system, or the operating system used. The configuration database stores values of these parameters in a persistent store and makes these values available to the system when a user launches the software package. When the software package is launched, the system accesses the database and obtains the values of the configuration parameters. The system uses these values to determine whether to activate particular features of the software package.

Advantageously, the improved techniques provide for a single software image that adapts to different system and licensing configurations. Because the system undergoes a discovery of its configuration upon a boot, it can determine changes in configuration from the previous boot. For example, the system may determine if the user upgraded a storage platform from block-only to unified block and file between boots. In this case, the system may determine the features available to the user given the state of the licenses in concert with the change in platform.

Figure 1:
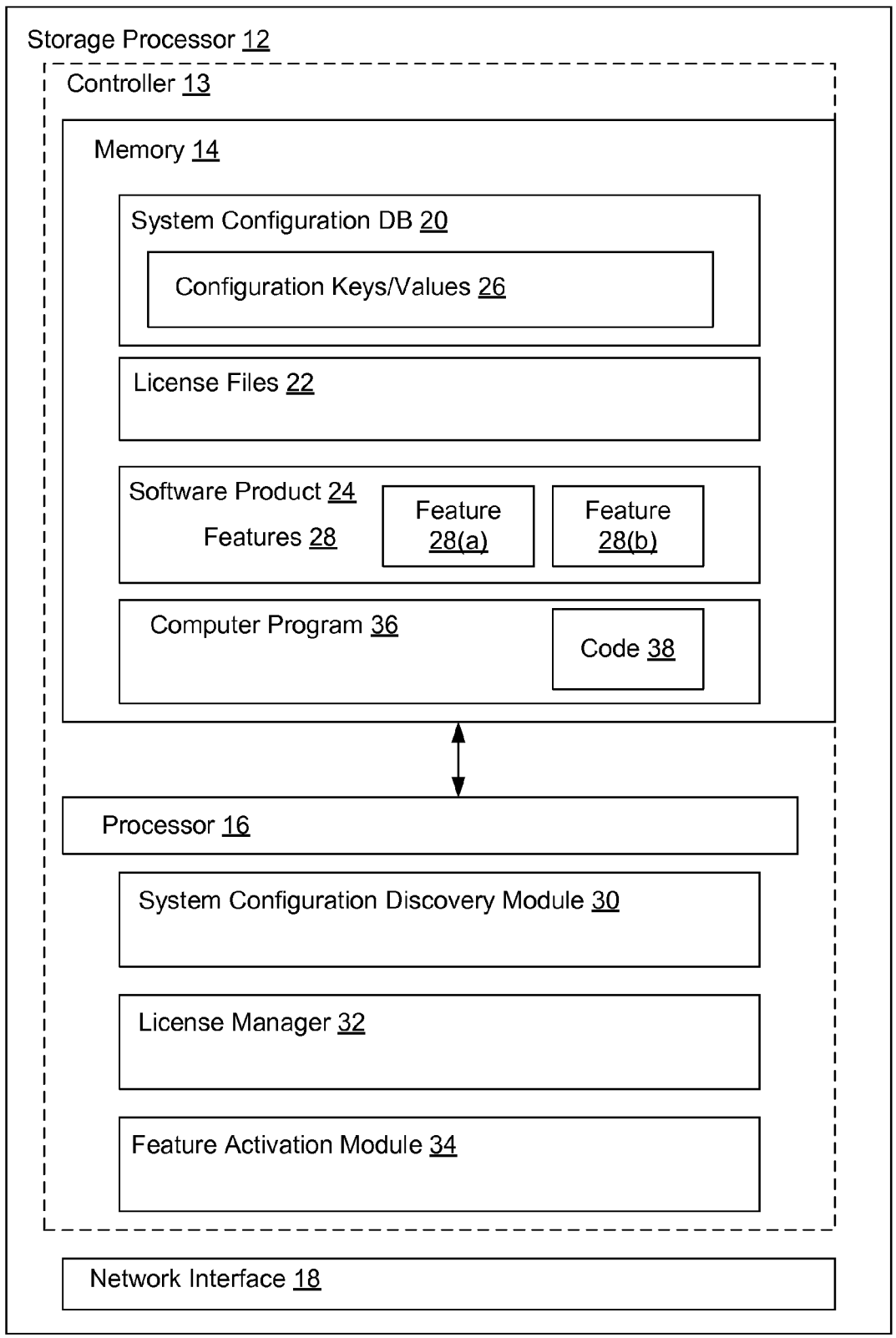
FIG. 1 is a block diagram illustrating an example storage processor in which the improved technique may be carried out.

FIG. 1 illustrates an example electronic environment 10 in which the improved technique may be carried out. Electronic environment 10 includes a storage processor 12 for controlling a storage system. Storage processor 12 includes controller 13 which includes memory 14 and processor 16, and network interface 18. Controller 13 also includes system configuration discovery module 30, license manager 32, and feature activation module 34.

Memory 14 is configured to store code 38 containing instructions for computer program 36. Memory 14 is also configured to store the code for the software product 24, which in turn has features 28(a) and 28(b) (features 28), as well as license files 22 for software product 24. Memory 14 is further configured to store a system configuration database 20. Memory 14 includes RAM and cache; in some arrangements, memory 14 also includes non-volatile memory such as solid-state memory or non-volatile RAM (NVRAM).

System configuration database 20 is configured to store system configuration parameters and their values. In some arrangements, system configuration database 20 includes a file 26 containing configuration keys and values; the configuration keys represent the system configuration parameters and are a convenient form for lookup operations.

Processor 16 is configured to execute instructions from code (e.g., code 38) stored in memory 14. Processor 16 is coupled to memory 14. Processor 16 takes the form of, but is not limited to, Intel or AMD-based CPU, and can include a single or multi-cores each running single or multiple threads.

System configuration discovery module 30 is configured to extract values of system configuration parameters upon a boot of storage processor 12. System configuration discovery module 30 is launched each time storage processor 12 goes through a boot process. In some arrangements, code for system configuration discovery module 30 is stored on a ROM BIOS (not depicted) in storage processor 12.

License manager 32 is configured to provide decisions as to which licenses in license files 22 are available for activation.

Feature activation module 34 is configured to provide logic pertaining to which features 28 of software product 24 are to be activated from values of configuration parameters in system configuration database 20 and information from license manager 32 pertaining to which licenses in license files 22 are available for activation. Feature activation module 34 executes instructions stored in code 38 that performs computations based on inputs from system configuration database 20 and license manager 32 and evaluates the results of the computations in light of the logic provided by feature dependencies. Such dependencies will be discussed below in connection with FIG. 4.

Operational details of system configuration discovery module 30 and feature activation module 34 are discussed below in connection with FIG. 2.

Figure 2:
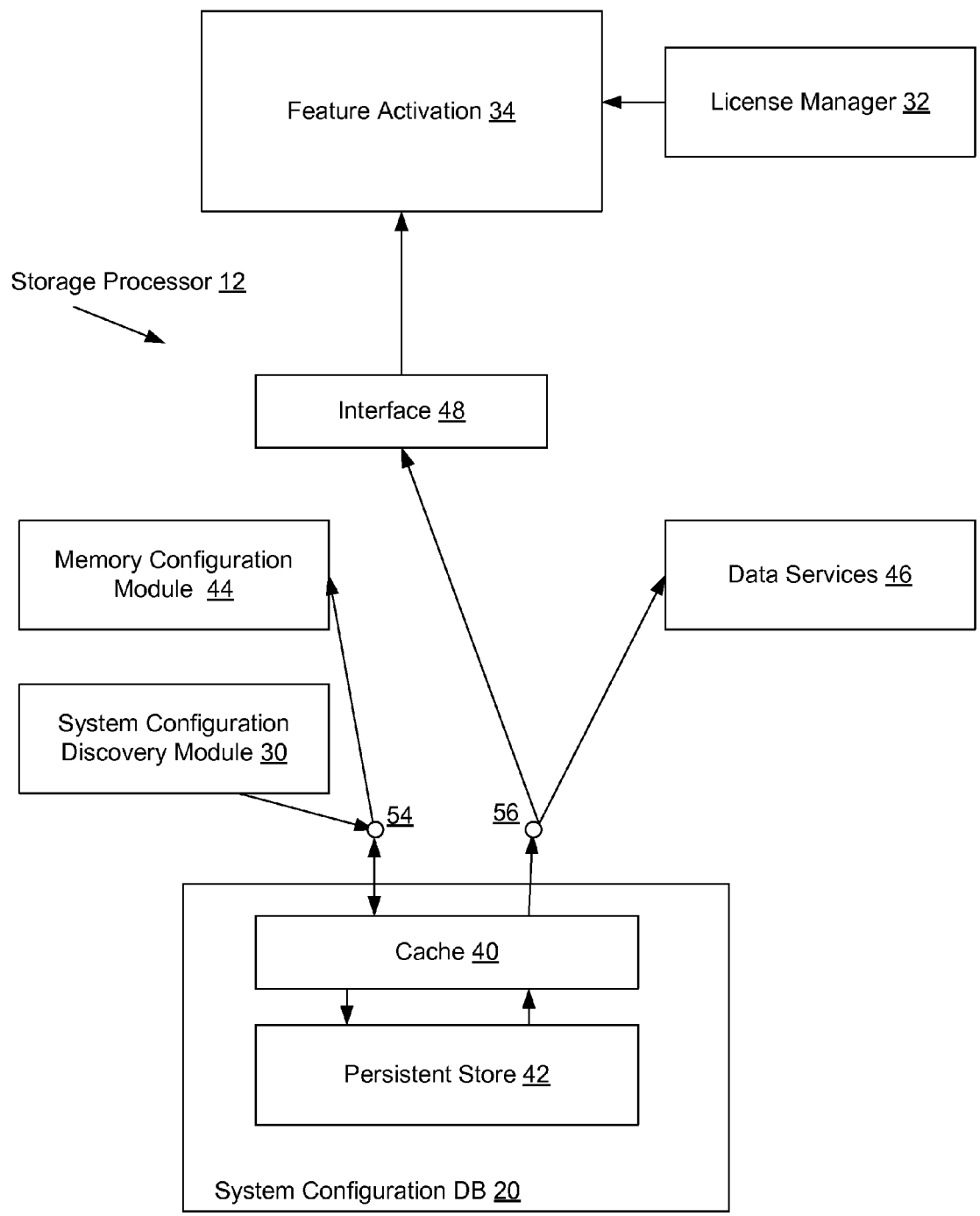
FIG. 2 is another block diagram illustrating the example storage processor shown in FIG. 1.

FIG. 2 illustrates an example different perspective of storage processor 12 from that illustrated in FIG. 1. As before, storage processor 12 includes system configuration database 20, license manager 32, and feature activation module 34. Storage processor 12 also includes memory configuration module 44, data services module 46, and interface 48 between system configuration database 20 and feature activation module 34.

Memory configuration module 44 is configured to execute instructions that allocate memory to software product 24. Memory configuration module 44 is further configured to receive configuration parameters from system configuration database 20 in order to determine how much memory to allocate.

Data services module 46 is configured to select for loading into memory 14 software drivers for features 28. Data services module 46 is further configured to receive configuration parameters from system configuration database 20 in order to determine which drivers to load into memory 14.

Interface 48 is configured to provide a communications channel between system configuration database 20 and feature activation module 34. In some arrangements, interface 48 includes an application programming interface (API) for exposing configuration parameter values to feature activation module 34. In some further arrangements, feature activation module runs within an EMC® Common Object Manager (ECOM), and API is further configured to expose parameter values to other modules within the ECOM such as a Unisphere™ CLI, distributed by EMC Corp. of Hopkinton, Mass.

It should be understood that system configuration database 20 includes a persistent store 42 and a cache 40. Persistent store 42 preserves stored configuration parameter values through a boot of storage processor 12. Cache 40, on the other hand, does not preserve this information through a boot.

During operation, a user performs a boot of storage processor 12. For example, the user may be an administrator that performed an upgrade of the storage processor 12 to support file services. In another example, the user upgraded the amount of RAM in storage processor 12. In either case, the administrator performed a boot operation in order to effect these changes in storage processor 12.

In response to the boot operation, storage processor 12 invokes system configuration discovery module 30. For example, system configuration discovery module 30 advances through a predetermined checklist stored in a ROM BIOS and extracts values of each parameter in the checklist. In some arrangements, however, system configuration discovery module 30 is invoked after the operating system loads and consults a checklist stored in memory 14.

After system configuration discovery module 30 obtains the parameter values that describe the configuration of storage processor 12, system configuration discovery module 30 stores these parameter values in system configuration database 20. In some arrangements, system configuration database 20 receives the parameter values in cache 40, which then stores the values in persistent store 42.

It should be understood that the parameter values may be stored in persistent store 42 within configuration file 26 (see FIG. 1). As discussed above, configuration file 26 contains a set of keys representing the various parameters. System configuration database 26 then may be configured to place each parameter value alongside its respective key.

In an example, system configuration discovery module 30 reads the platform type of storage supported by storage processor 12. Platform types may include, for example, those supporting block-based storage only, and those supporting both block- and file-based storage. System configuration discovery module 30 may also check the amount of RAM within memory 14.

In some arrangements, storage processor 12 verifies whether the value corresponding to a key in XML file 26 matches that found by system configuration discovery module 30. If there is a match, then storage processor 12 does not write the parameter value to XML file 26.

Upon storage of the parameters values, storage processor 12 notifies memory configuration module 44 and data services module 46 that system configuration database 20 is ready to be read. Each of the modules 44 and 46 reads the parameter values from system configuration database 20 and allocates memory and selects drivers for features according to the parameter values read. For example, in an upgrade from a block-only platform to a platform supporting files, along with an increase in RAM, the modules 44 and 46 allocate an increased amount of RAM and make additional drivers available to allow for file-based features to be loaded into memory 14 if appropriately licensed.

At some point later, a user attempts to launch software product 24. For example, the user may wish to perform a file-based operation such as NFS or DEDUPE. In this case, feature activation module 34 reads system configuration database 20 via interface 48 to determine which features may be run on storage processor 12. Feature activation module 34 also establishes a communication with license manager 32 to determine which features 28 are not only available, but licensed. In considering both these factors, feature activation module 34 is able to determine through the application of a business logic scheme which features 28 to activate.

Further details of an example feature activation operation for activating features of storage system control software are discussed below in connection with FIG. 3.

Figure 3:
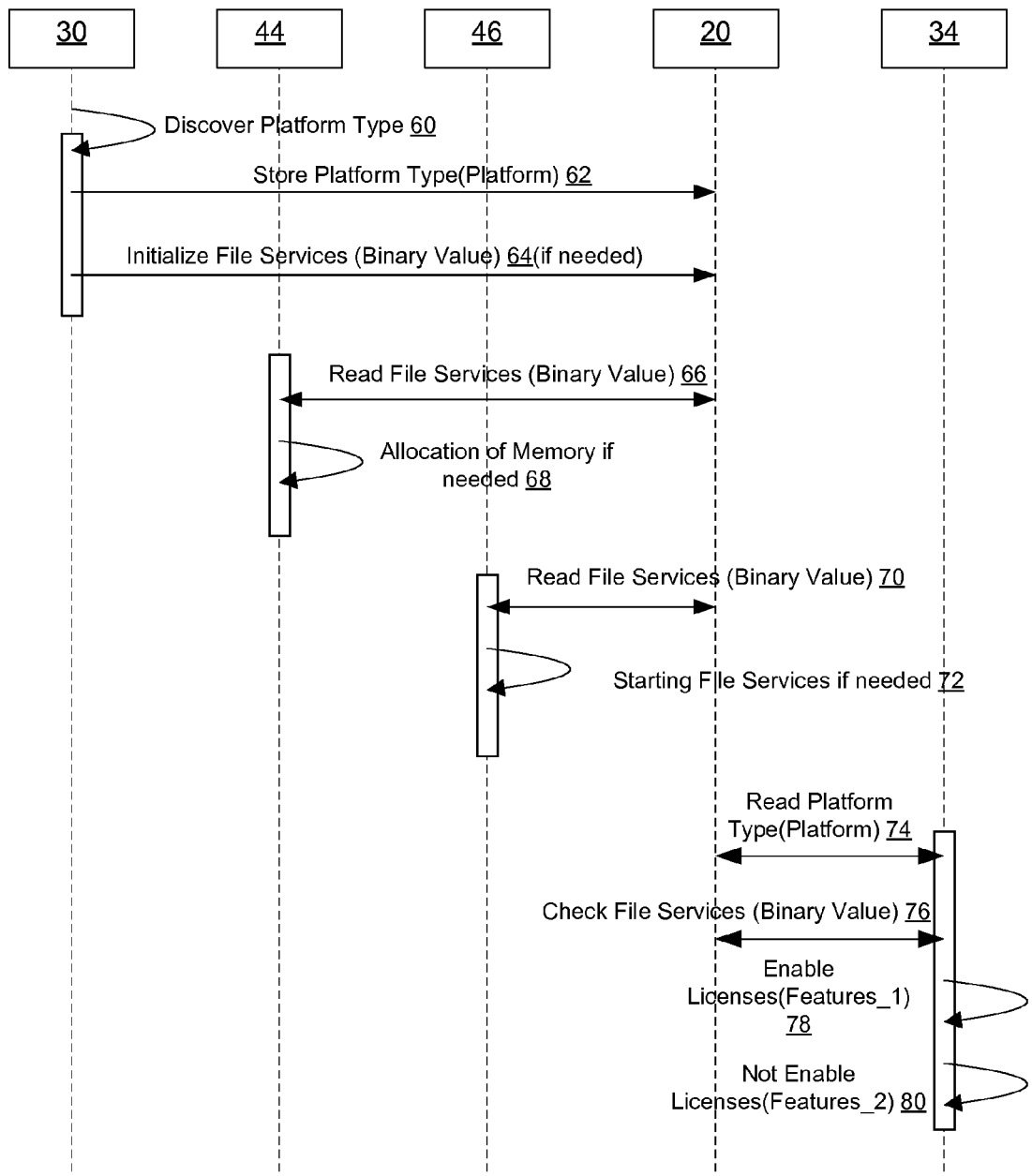
FIG. 3 is a sequence diagram illustrating an example system configuration discovery and application launch within the storage processor shown in FIG. 2.

FIG. 3 illustrates a sequence diagram that describes the interplay between system configuration discovery module 30, memory configuration module 44, data services module 46, system configuration database 20, and feature activation module 34.

Upon a boot of storage processor 12, system configuration discovery module 30 discovers in step 60 a platform type which describes the type of storage platform supported by software product 24. For example, if a parameter PLATFORM_TYPE has the value "Beachcomber", then the feature FILE_SERVICES is turned on. On the other hand, if PLATFORM_TYPE has value "Silverbolt", then FILE_SERVICES is turned off.

Once storage processor 12 determines the value of PLATFORM_TYPE, storage processor 12 stores the value of PLATFORM_TYPE in system configuration database 20 in step 62. In step 64, storage processor 12 either initializes FILE_SERVICES or not according to the value of PLATFORM_TYPE.

In step 66, memory configuration module 44 reads system configuration database 20 to determine whether FILE_SERVICES has been initiated or not. In step 68, memory configuration module 44 allocates memory to software product 24 according to whether FILE_SERVICES has been initiated or not.

In step 70, data services module 46 reads system configuration database 20 to determine whether FILE_SERVICES has been initiated or not. In step 72, memory configuration module 44 starts drivers associated with FILE_SERVICES, or not, depending on whether FILE_SERVICES has been initiated or not.

In step 74, a user has attempted to launch software product 24 and, in response, feature activation module 34 reads the value of PLATFORM_TYPE from system configuration database 20. In step 76, feature activation module 34 checks whether FILE_SERVICES has been initiated or not. In step 78, feature activation module 34 enables licenses in license files 22 according to the value of PLATFORM_TYPE and whether FILE_SERVICES has been initiated or not, as well as the state of the licenses. In step 80, feature activation module 34 similarly does not enable licenses in license files 22 according to the same.

It should be understood that the initialization of FILE_SERVICES has ramifications for other features 28 that depend from FILE_SERVICES. Further details of feature interdependence are described below in connection with FIG. 4.

Figure 4:
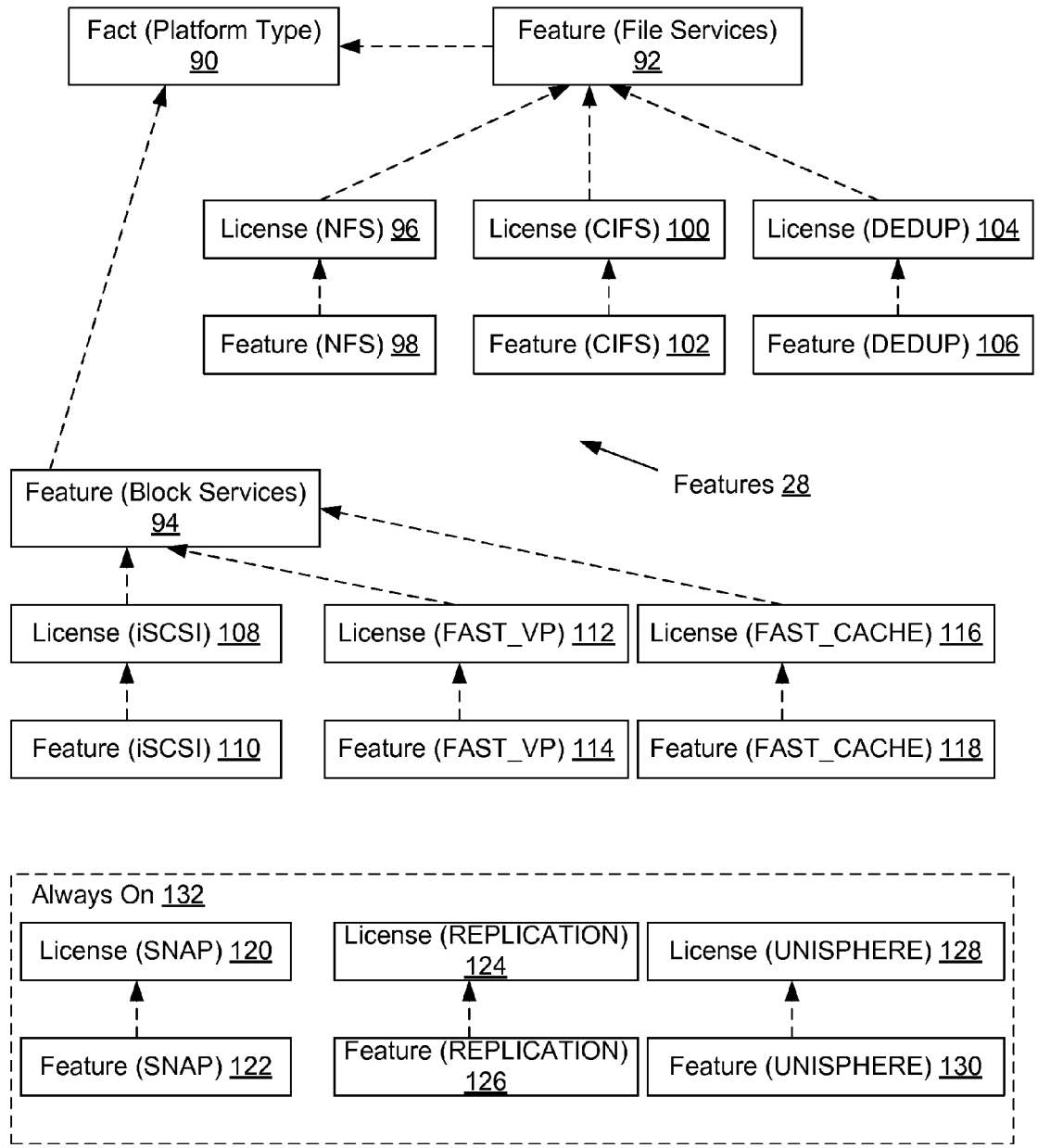
FIG. 4 is a block diagram illustrating example feature dependencies within the storage processor shown in FIG. 2.

FIG. 4 illustrates an example group of features 28 arranged by their dependences on base features such as FILE_SERVICES 92 and BLOCK_SERVICES 94. Whether these features are initialized depends, as noted above, on the value of PLATFORM_TYPE 90. It should be understood that, if either of these features is turned off (i.e., not initialized), then all dependent features are also turned off.

For example, the feature FILE_SERVICES 92 has dependent features including NFS 98, CIFS 102, and DEDUP 106. For each of these features, there are corresponding licenses 96, 100, and 104, respectively. If FILE_SERVICES 92 is turned off (e.g., because PLATFORM_TYPE 90="silverbolt"), then each of these features is also turned off. If FILE_SERVICES 92 is turned on, however, then feature activation module 34 consults license manager 32 for the state of the dependent licenses 96, 100, and 104.

Similarly, the feature BLOCK_SERVICES 94 has dependent features including iSCSI 110, FAST_VP 114, and FAST_CACHE 118 with corresponding licenses 108, 112, and 116. If BLOCK_SERVICES 94 is turned off, then each of these features is also turned off. If BLOCK_SERVICES 94 is turned on, however, then feature activation module 34 consults license manager 32 for the state of the dependent licenses 108, 112, and 116.

There may also be other features not dependent upon these base features 92 and 94. For example, the features SNAP 122, REPLICATION 126, and UNISPHERE 130 are always on regardless of the value of PLATFORM_TYPE 90. These features have respective licenses 120, 124, and 128.

Figure 5:
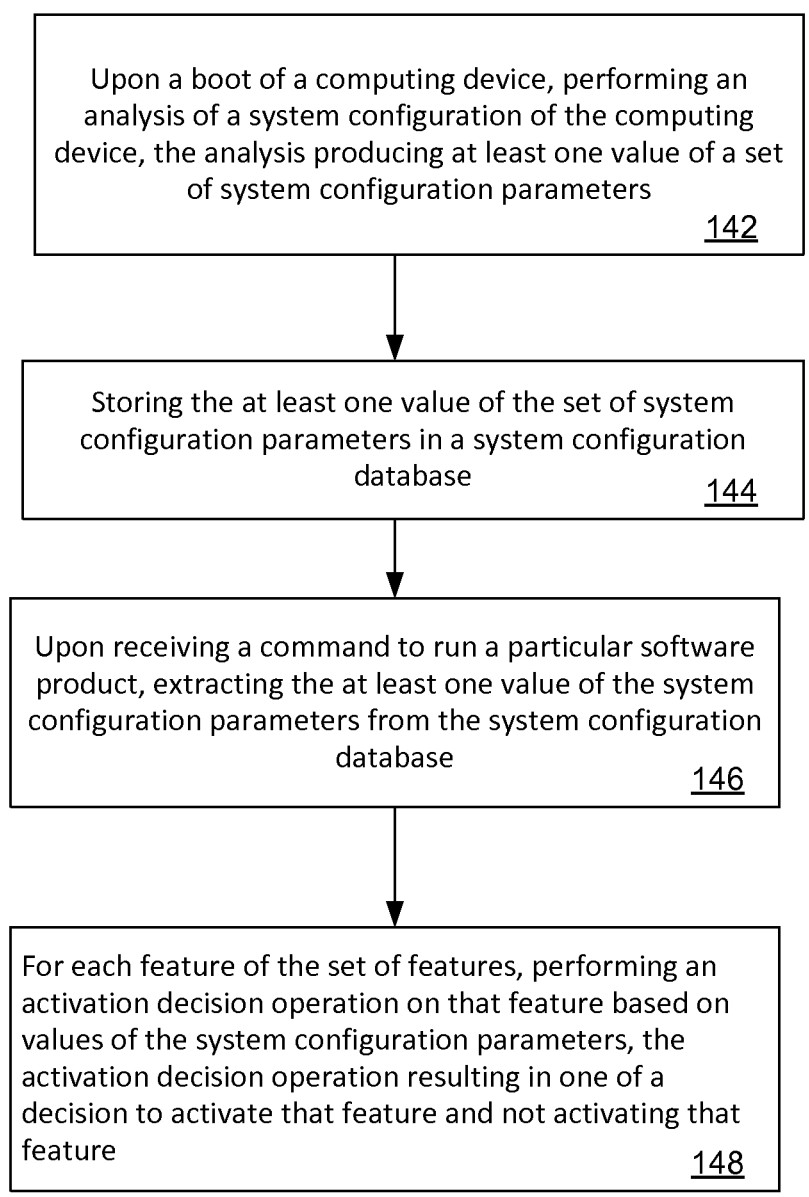
FIG. 5 is a flow chart illustrating an example method of carrying out the improved technique within the electronic environment shown in FIG. 1.

FIG. 5 illustrates a method 140 of operating a computing device configured to run a particular software product, the software product including a set of features, including steps 142, 144, 146, and 148. In step 142, an analysis of a system configuration of the computing device is performed upon a boot of the computing device, the analysis producing values of a set of system configuration parameters. In step 144, the values of the set of system configuration parameters are stored in a system configuration database. In step 146, the values of the system configuration parameters from the system configuration database are extracted upon receiving a command to run the particular software product. In step 148, for each feature of the set of features, an activation decision operation is performed on that feature based on values of the system configuration parameters, the activation decision operation resulting in one of a decision to activate that feature and not activating that feature.

As used throughout this document, the words "comprising," "including," and "having" are intended to set forth certain items, steps, elements, or aspects of something in that these are provided by way of example only and the invention is not limited to these particular embodiments. In addition, the word "set" as used herein indicates one or more of something, unless a statement is made to the contrary.

It should be understood that the improvement described here has a number of applications, including providing a single licensing architecture for a software product.

Having described certain embodiments, numerous alternative embodiments or variations can be made. For example, the above discussion dealt mainly with determining a licensing configuration based on a recent change in a local system configuration. In some arrangements, however, storage processor 12 may store configuration information remote from storage processor 12. Also, the examples presented above dealt mainly with storage system applications. Nevertheless, the licensing architecture described here may be applied to any other complex software, such as simulation software. Further, configuration file 26 may be, in some arrangements, an XML file.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of operating a computing device configured to run a particular software product, the software product including a set of features, the method comprising:
   upon a boot of the computing device, performing an analysis of a system configuration of the computing device, the analysis producing values of a set of system configuration parameters;
   storing the values of the set of system configuration parameters in a system configuration database;
   upon receiving a command to run the particular software product, extracting the values of the system configuration parameters from the system configuration database; and
   for each feature of the set of features, performing an activation decision operation on that feature based on values of the system configuration parameters, the activation decision operation resulting in one of a decision to activate that feature and not activating that feature;
   wherein:
   the software product supports a storage system, a system configuration parameter of the software product being a platform for the storage system, the platform indicating whether the storage system offers block-level services or a combination of block-level and file-level services for making storage visible over a network; and
   performing the activation decision operation on that feature based on values of the system configuration parameters includes basing the activation decision on the platform of the storage system.

2. A method as in claim 1,
   wherein each feature of the set of features has a corresponding license; and
   wherein the method further comprises:
      for each feature of the set of features, performing the activation decision operation on that feature based on a state of the corresponding license of that feature, that feature being able to provide its distinct function when its corresponding license is activated, that feature not being able to provide its distinct function when its corresponding license is not activated.

3. A method as in claim 2,
   wherein each feature of the set of features further includes i) a state having a value equal to one of turned off, not licensed, and turned on and ii) a feature flag exposing the state, the feature flag of that feature having a binary value corresponding to an off value or an on value, the off value to which the value a feature flag of a feature corresponds indicating that the feature is not activated, the on value to which the value a feature flag of a feature corresponds indicating that the feature is activated;
   wherein performing the activation decision operation further includes:
      computing the binary value of the feature flag for a feature of the set of features based on the at least one value of the system configuration parameters and the state of the corresponding license of that feature.

4. A method as in claim 3,
   wherein at least one feature of the set of features is dependent on another feature of the set of features;
   wherein computing the binary value of the feature flag includes:
      when the feature flag of the other feature has its binary value corresponding to the off value, setting the binary value of feature flag of the at least one feature to the value corresponding to the off value.

5. A method as in claim 1,
wherein the system configuration database includes a persistent store configured to store values of system configuration parameters through a boot of the computing device;
wherein storing the at least one value of the set of system configuration parameters in the system configuration database includes:
writing the at least one value of the set of system configuration parameters into the persistent store.

6. A method as in claim 5,
wherein performing the analysis of the system configuration of the computing device includes:
assessing an amount of RAM available to the computing device;
wherein storing the at least one value of the set of system configuration parameters in the system configuration database includes:
verifying whether the assessed amount of RAM available to the computing device matches a value of the amount of RAM available to the computing device written to the persistent store, and
when the assessed amount of RAM available to the computing device is different from the value of the amount of RAM available to the computing device written to the persistent store, writing the assessed amount of RAM available to the computing device to the persistent store.

7. A method as in claim 6,
wherein the computing device includes a memory configuration module configured to allocate memory for the software product;
wherein extracting the at least one value of the system configuration parameters from the system configuration database includes:
reading the system configuration database; and
allocating memory for the software product based on the at least one value of the system configuration parameters and the assessed amount of RAM.

8. A method as in claim 7,
wherein the computing device further includes a data services module configured to supply software drivers to the computing device based on the at least one value of the system configuration parameters;
wherein extracting the at least one value of the system configuration parameters from the system configuration database includes:
reading the system configuration database; and
supplying software drivers for the software product based on the at least one value of the system configuration parameters.

9. A method as in claim 1,
wherein the system configuration database includes a configuration file that stores the system configuration parameters as keys; and
wherein storing the at least one value of the set of system configuration parameters in the system configuration database includes:
writing the at least one value of the set of system configuration parameters in the configuration file along with a corresponding key.

10. A computing device configured to run a particular software product, the software product including a set of features, each of the set of features having a corresponding license, the computing device comprising:
memory; and
a controller including controlling circuitry, the controlling circuitry being constructed and arranged to:
upon a boot operation of the computing device, perform an analysis of a system configuration of the computing device, the analysis producing values of a set of system configuration parameters;
store the values of the set of system configuration parameters in a system configuration database;
upon receiving a command to run the particular software product, extract the values of the system configuration parameters from the system configuration database; and
for each feature of the set of features, performing an activation decision operation on that feature based on values of the system configuration parameters, the activation decision operation resulting in one of a decision to activate that feature and not activating that feature;
wherein:
the software product supports a storage system, a system configuration parameter of the software product being a platform for the storage system, the platform indicating whether the storage system offers block-level services or a combination of block-level and file-level services for making storage visible over a network; and
performing the activation decision operation on that feature based on values of the system configuration parameters includes basing the activation decision on the platform of the storage system.

11. A computing device as in claim 10,
wherein each feature of the set of feature has a corresponding license;
wherein the controlling circuitry is further constructed and arranged to:
for each feature of the set of features, perform the activation decision operation on that feature based on a state of the corresponding license of that feature, that feature being able to provide its distinct function when its corresponding license is activated, that feature not being able to provide its distinct function when its corresponding license is not activated.

12. A computing device as in claim 11,
wherein each feature of the set of features further includes i) a state having a value equal to one of turned off, not licensed, and turned on and ii) a feature flag exposing the state, the feature flag of that feature having a binary value corresponding to an off value or an on value, the off value to which the value a feature flag of a feature corresponds indicating that the feature is not activated, the on value to which the value a feature flag of a feature corresponds indicating that the feature is activated;
wherein the controlling circuitry constructed and arranged to perform the activation decision operation is further constructed and arranged to:
compute the binary value of the feature flag for a feature of the set of features based on the at least one value of the system configuration parameters and the state of the corresponding license of that feature.

13. A computing device as in claim 12,
wherein at least one feature of the set of features is dependent on another feature of the set of features;
wherein the controlling circuitry constructed and arranged to compute the binary value of the feature flag is further constructed and arranged to:

when the feature flag of the other feature has its binary value corresponding to the off value, setting the binary value of feature flag of the at least one feature to the value corresponding to the off value.

14. A computing device as in claim 10,
wherein the system configuration database includes a persistent store configured to store values of system configuration parameters through a boot of the computing device;
wherein the controlling circuitry constructed and arranged to store the at least one value of the set of system configuration parameters in the system configuration database is further constructed and arranged to:
write the at least one value of the set of system configuration parameters into the persistent store.

15. A computing device as in claim 14,
wherein the controlling circuitry constructed and arranged to perform the analysis of the system configuration of the computing device is further constructed and arranged to:
assess an amount of RAM available to the computing device; and
wherein the controlling circuitry constructed and arranged to store the at least one value of the set of system configuration parameters in the system configuration database is further constructed and arranged to:
verify whether the assessed amount of RAM available to the computing device matches a value of the amount of RAM available to the computing device written to the persistent store, and
when the assessed amount of RAM available to the computing device is different from the value of the amount of RAM available to the computing device written to the persistent store, write the assessed amount of RAM available to the computing device to the persistent store.

16. A computing device as in claim 15,
wherein the computing device includes a memory configuration module configured to allocate memory for the software product;
wherein the controlling circuitry constructed and arranged to extract the at least one value of the system configuration parameters from the system configuration database is further constructed and arranged to:
read the system configuration database; and
allocate memory for the software product based on the at least one value of the system configuration parameters and the assessed amount of RAM.

17. A computing device as in claim 16,
wherein the computing device further includes a data services module configured to supply software drivers to the computing device based on the at least one value of the system configuration parameters;
wherein the controlling circuitry constructed and arranged to extract the at least one value of the system configuration parameters from the system configuration database is further constructed and arranged to:
read the system configuration database; and
supply software drivers for the software product based on the at least one value of the system configuration parameters.

18. A computer program product having a non-transitory, computer-readable storage medium which stores instructions that, when executed by a computing device configured to run a particular software product, the software product including a set of features, cause the computing device to:
upon a boot of the computing device, perform an analysis of a system configuration of the computing device, the analysis producing at least one value of a set of system configuration parameters;
store the at least one value of the set of system configuration parameters in a system configuration database;
upon receiving a command to run the particular software product, extract the at least one value of the system configuration parameters from the system configuration database; and
for each feature of the set of features, perform an activation decision operation on that feature based on values of the system configuration parameters, the activation decision operation resulting in one of a decision to activate that feature and not activating that feature;
wherein:
the software product supports a storage system, a system configuration parameter of the software product being a platform for the storage system, the platform indicating whether the storage system offers block-level services or a combination of block-level and file-level services for making storage visible over a network; and
performing the activation decision operation on that feature based on values of the system configuration parameters includes basing the activation decision on the platform of the storage system.

19. A method as in claim 1, wherein the computing device includes a storage processor of a data storage system;
wherein the set of system configuration parameters includes parameters describing the storage processor;
wherein performing the analysis of the system configuration of the computing device includes producing values of the parameters describing the storage processor.

20. A method as in claim 19, wherein extracting the values of the system configuration parameters from the system configuration database includes automatically providing, by the storage processor, the values of the parameters describing the storage processor.

21. A method as in claim 20, wherein automatically providing, by the storage processor, the values of the parameters describing the storage processor includes not providing manual input.

* * * * *